(12) United States Patent
Hsu

(10) Patent No.: US 11,118,709 B2
(45) Date of Patent: Sep. 14, 2021

(54) TUBE CLAMP

(71) Applicant: Yen-Huang Hsu, Changhua (TW)

(72) Inventor: Yen-Huang Hsu, Changhua (TW)

(*) Notice: Subject to any disclaimer, the term of this patent is extended or adjusted under 35 U.S.C. 154(b) by 293 days.

(21) Appl. No.: 16/247,392

(22) Filed: Jan. 14, 2019

(65) Prior Publication Data

US 2020/0224804 A1 Jul. 16, 2020

(51) Int. Cl.
*F16L 21/00* (2006.01)
*F16L 37/05* (2006.01)
*F16L 37/20* (2006.01)
*F16B 7/14* (2006.01)

(52) U.S. Cl.
CPC .......... *F16L 21/007* (2013.01); *F16B 7/1454* (2013.01); *F16L 37/05* (2013.01); *F16L 37/20* (2013.01)

(58) Field of Classification Search
CPC ......... F16L 21/007; F16L 37/05; F16L 37/20; F16L 33/12; F16L 27/1273; F16B 7/1454; Y10T 24/142; Y10T 24/1424; Y10T 403/32501; Y10T 403/7071
USPC ......................................... 285/311, 312, 421
See application file for complete search history.

(56) References Cited

U.S. PATENT DOCUMENTS

| | | | | |
|---|---|---|---|---|
| 5,154,449 | A * | 10/1992 | Suei-Long | F16B 7/1454 |
| 6,142,699 | A * | 11/2000 | Pao | F16B 7/1454 |
| 7,179,200 | B1 * | 2/2007 | Wu | |
| 8,979,050 | B2 * | 3/2015 | Yu | F16B 7/1454 |
| 2002/0030146 | A1 * | 3/2002 | Akaike | |
| 2015/0139717 | A1 * | 5/2015 | Bukovitz | F16B 7/1454 403/109.5 |

FOREIGN PATENT DOCUMENTS

FR 1451080 A * 6/1966 ............... F16L 37/05

* cited by examiner

*Primary Examiner* — Zachary T Dragicevich
(74) *Attorney, Agent, or Firm* — Che-Yang Chen; Law Office of Michael Chen

(57) ABSTRACT

A tube clamp may include a tube body, an abutting block, and a clamping member, and a pivot connecting portion is formed at a lateral edge of the tube body. A through hole penetrates through a lateral surface of the tube body, and each of two lateral edges of the through hole has a first locating protrude having a stepped surface. The abutting block is slidably installed in the through hole, and each of two lateral sides of the abutting block comprises a second locating protrude, and the two second locating protrudes are respectively coupled with the two first locating protrudes. The clamping member has a protruding portion and a pulling portion. Through pulling the pulling portion, the protruding portion is adapted to press the abutting block into an inner space of the tube body so as to achieve the clamping effect of the tube clamp.

6 Claims, 10 Drawing Sheets

& nbsp;
TUBE CLAMP

FIELD OF THE INVENTION

The present invention relates to a tube clamp and more particularly to a tube clamp with high tightening strength.

BACKGROUND OF THE INVENTION

Referring to FIGS. 12 and 13, a conventional tube clamp (50) comprises a clamping tube (51), a clamping piece (52) and a handle (53). The clamping piece (52) is integrally formed with the clamping tube (51), and the handle (53) is pivotally connected on the clamping tube (51) at an eccentric portion of the tube clamp (50). The clamping tube (51) has an inner column space (511) which is configured to be axially penetrated by a telescopic tube (60), and the clamping piece (52) is located adjacent to the column space (511). When the handle (53) is pulled to couple on the clamping tube (51), the handle (53) is configured to press the clamping piece (52) inwardly, such that the clamping piece (52) is adapted to move inwardly so as to clamp the telescopic tube (60). On the other hand, when handle (53) is pulled back to an initial position to detach from the clamping tube (51), the clamping piece (52) is configured to back to an initial position thereof so as to release the telescopic tube (60).

However, the conventional tube clamp has following disadvantages: (i) one end of the clamping piece (52) is pivotally connected to the clamping tube (51) to enable the other end thereof to be a free end, such that when the handle (53) is pulled to achieve clamping effect, the clamping piece (52) can only partially couple on the telescopic tube (60), which greatly reduce the tightening strength of the tube clamp (50); and (ii) a connecting portion between the clamping piece (52) and after a period of time for use, the clamping tube (51) is prone to broken and loses its clamping function. Therefore, there remains a need for a new and improved design for a tube clamp to overcome the problems presented above.

SUMMARY OF THE INVENTION

The present invention provides a tube clamp which comprises a tube body, an abutting block, and a clamping member, and a pivot connecting portion is formed at a lateral edge of the tube body. A through hole penetrates through a lateral surface of the tube body at a position corresponding to the pivot connecting portion, and each of two lateral edges of the through hole has a first locating protrude having a stepped surface. A lateral surface of the abutting block faced to the through hole is formed into a concave surface. The abutting block is slidably installed in the through hole, and each of two lateral sides of the abutting block comprises a second locating protrude, and the two second locating protrudes are respectively coupled with the two first locating protrudes so as to position the abutting block. The clamping member has a protruding portion and a pulling portion, and the protruding portion comprises a connecting hole at an eccentric portion thereof, and a bolt is configured to sequentially penetrate through one ear portion, the connecting hole, and the other ear portion to pivotally connect the clamping member with the pivot connecting portion of the tube body. Through pulling the pulling portion, the protruding portion is adapted to press the abutting block into an inner space of the tube body so as to achieve the clamping effect of the tube clamp.

In one embodiment, two parallel ear portions horizontally protrude from an outer periphery of the tube body at different heights to form the pivot connecting portion therebetween, and the clamping member is pivotally connected to the tube body through the two ear portions so as to have vertical axis of rotation when pulled.

In another embodiment, the two parallel ear portions, which are separated apart, horizontally protrude from the outer periphery of the tube body at the same height to form the pivot connecting portion therebetween, and the clamping member is pivotally connected to the tube body through the two ear portions so as to have horizontal axis of rotation when pulled.

In still another embodiment, the tube body is a hollow cylinder.

In a further embodiment, a lower portion of the tube body of the tube clamp is formed into an engaging portion which has a larger outer diameter than the tube body; a step-shaped abutting edge is formed at an upper end of an inner periphery of the engaging portion, and a plurality of vertical ribs horizontally protrude from an inner wall of the engaging portion.

In still a further embodiment, the concave surface of the abutting block has a plurality of convexes thereon.

In a particular embodiment, the concave surface of the abutting block has a plurality of horizontal ribs thereon.

Comparing with conventional tube clamp, the present invention is advantageous because: (i) the abutting block is slidably coupled with the through hole so that the abutting block can evenly shift into the tube body, which increases the coupled area between the abutting block and the vertical tube so as to improve the clamping strength; and (ii) with the cooperating between the first locating protrudes and the second locating protrudes, the abutting block is not detached from the through hole when the clamping member is operated, which improves the clamping effect of the tube clamp.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
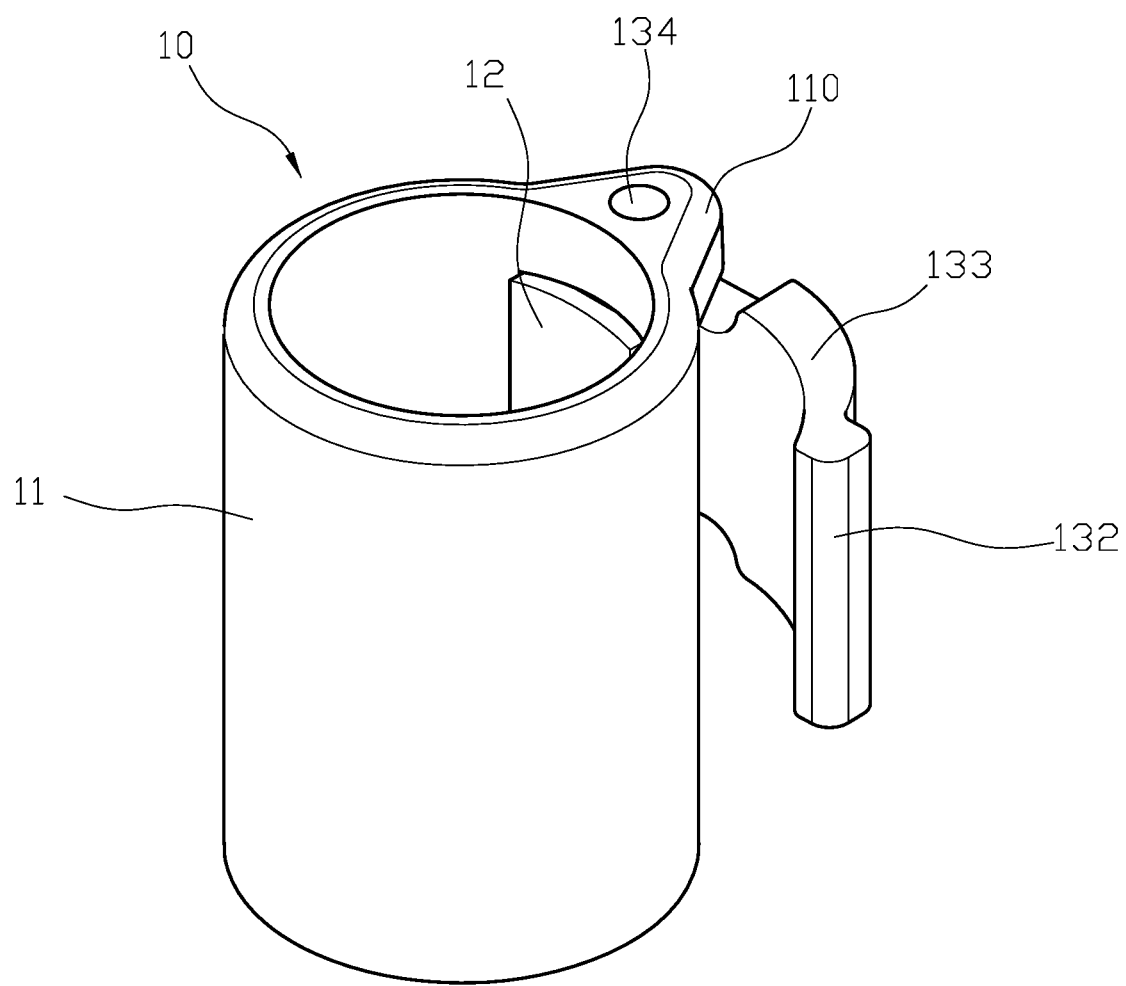
FIG. 1 is a three-dimensional assembly view of a tube clamp of the present invention.
Figure 2:
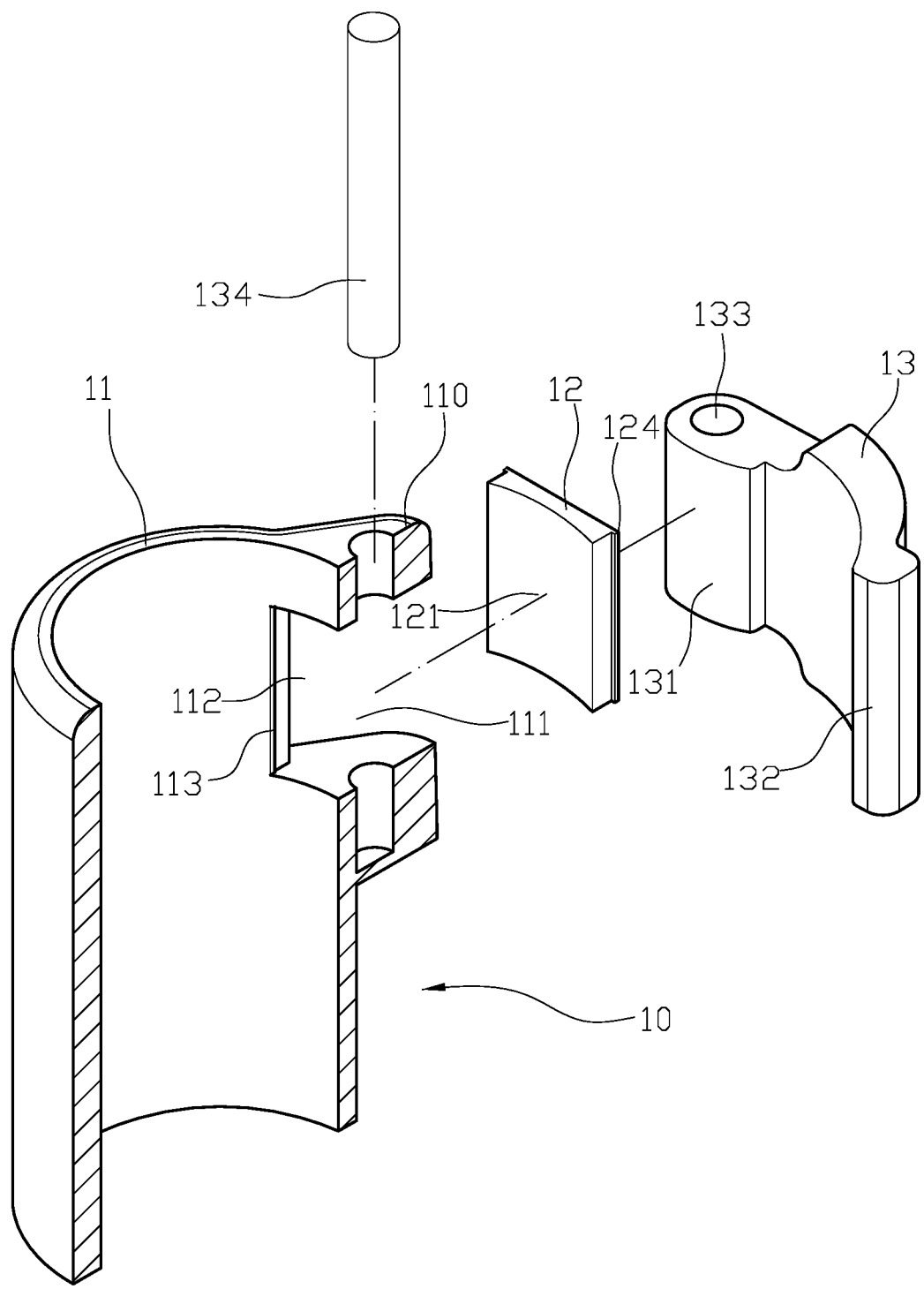
FIG. 2 is a three-dimensional exploded view of the tube clamp of the present invention.
Figure 3:
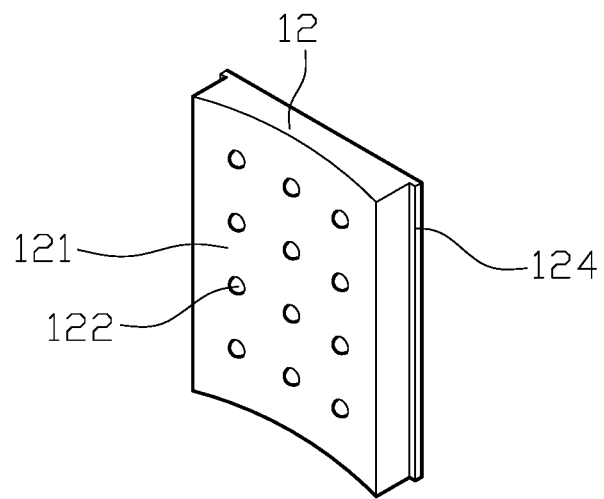
FIG. 3 is a three-dimensional view illustrating a plurality of convexes formed on a concave surface of an abutting block of the tube clamp in the present invention.
Figure 4:
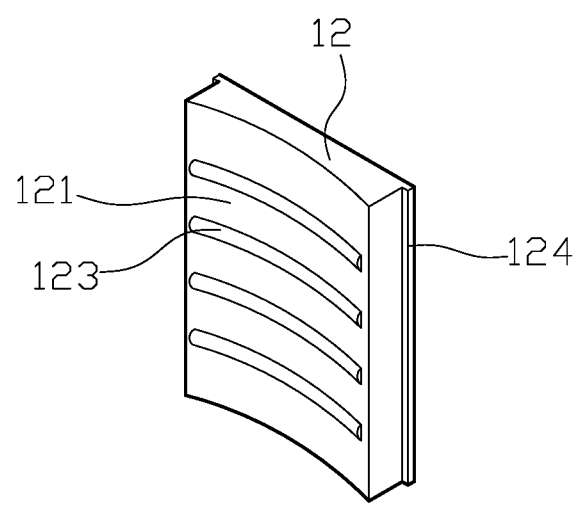
FIG. 4 is a three-dimensional view illustrating a plurality of horizontal ribs formed on the concave surface of the abutting block of the tube clamp in the present invention.

In order to further understand the goal, characteristics and effect of the present invention, a number of embodiments along with the drawings are illustrated as following:

Referring to FIGS. 1 and 2, the present invention provides a tube clamp (10) which comprises a tube body (11), an abutting block (12), and a clamping member (13). The tube body (11) is a hollow cylinder, and two parallel ear portions (110) horizontally protrude from an outer periphery of the tube body (11) at different heights to form a pivot connecting portion (111) therebetween, and the clamping member (13) is pivotally connected to the tube body (11) through the two ear portions (110) so as to have vertical axis of rotation when pulled. A through hole (112) penetrates through a lateral surface of the tube body (11) at a position corresponding to the pivot connecting portion (111), and each of two lateral edges of the through hole (112) has a first locating protrude (113) having a stepped surface. A lateral surface of the abutting block (12) faced to the through hole (112) is formed into a concave surface (121). Also, the concave surface (121) may have a plurality of convexes (122) thereon (as shown in FIG. 3) or may have a plurality of horizontal ribs (123) thereon (as shown in FIG. 4). Moreover, the abutting block (12) is configured to slide along the through hole (112), and each of two lateral sides of the abutting block (12) comprises a second locating protrude (124), and the two second locating protrudes (124) are respectively coupled with the two first locating protrudes (113) to position the abutting block (12). The clamping member (13) has a protruding portion (131) and a pulling portion (132), and the protruding portion (131) comprises a connecting hole (133) vertically at an eccentric portion thereof, and a bolt (134) is configured to vertically penetrate through one ear portion (110), the connecting hole (133), and the other ear portion (110) to pivotally connect the clamping member (13) with the pivot connecting portion (111) of the tube body (11). Through pulling the pulling portion (132), the protruding portion (131) is adapted to press the abutting block (12) into an inner space of the tube body (11) so as to achieve the clamping effect of the tube clamp (10).

Figure 5:
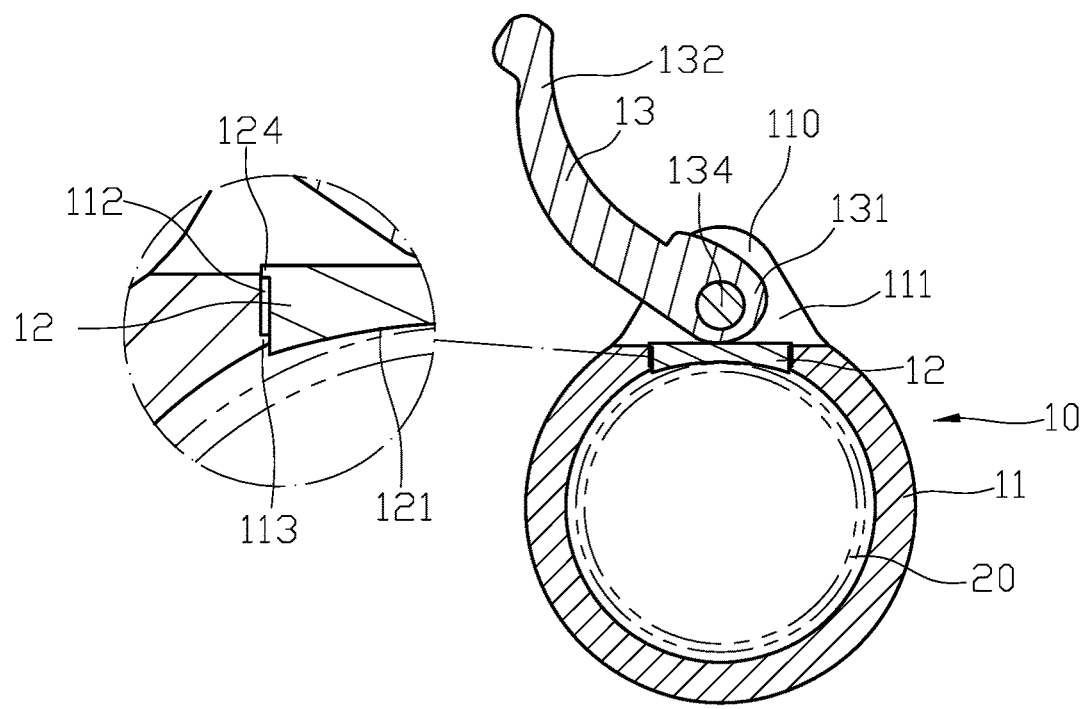
FIG. 5 is a schematic view illustrating the tube clamp of the present invention disposed on a vertical tube.
Figure 6:
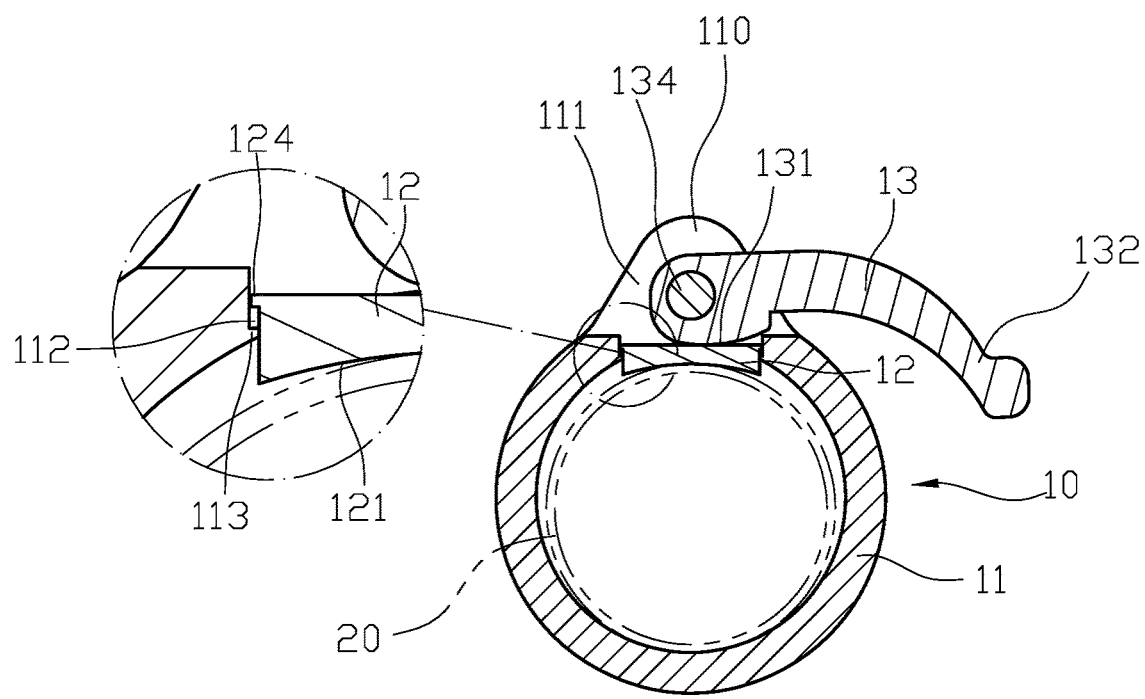
FIG. 6 is a schematic view illustrating the abutting block of the tube clamp clamping the vertical tube.
Figure 7:
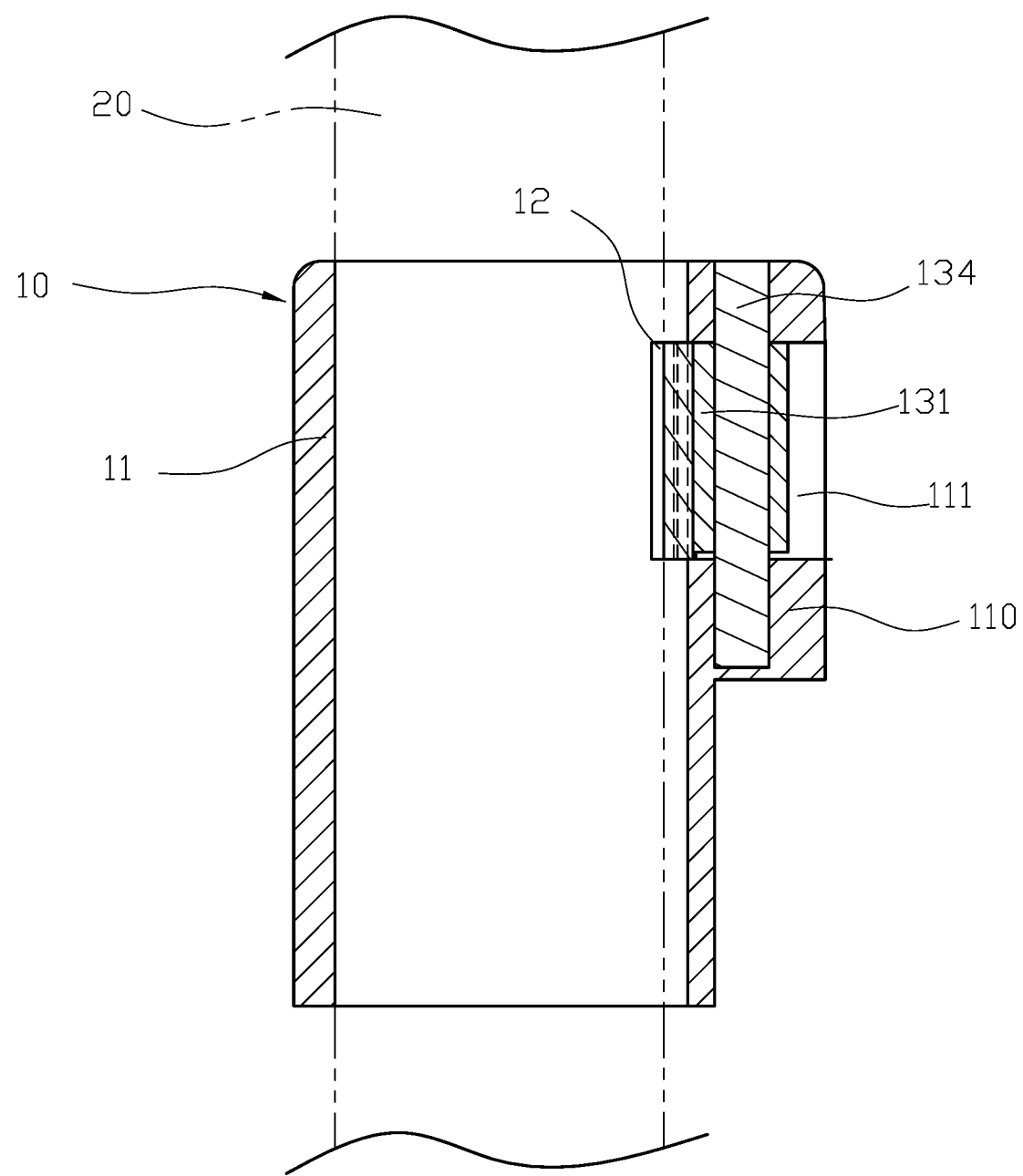
FIG. 7 is a schematic view from another angle illustrating the abutting block of the tube clamp clamping the vertical tube.

Referring to FIGS. 5 to 7, before using of the tube clamp (10), the clamping member (13) is pulled away from the tube body (11) to release the abutting block (12), and the abutting block (12) is adapted to slide out from the inner space of the tube body (11) such that the tube body (11) is adapted to be disposed on a vertical tube (20). The clamping member (13) is connected to the pivot connecting portion (111) at the eccentric position of the tube body (11), so that when the abutting member (13) is pulled back toward the tube body (11), the protruding portion (131) is configured to press the abutting block (12) into the through hole (112) so as to enable the abutting block (12) to abut against an outer wall of the vertical tube (20), thereby achieving the clamping effect of the tube clamp (10).

In addition, when the tube clamp (10) is not in use, the two second locating protrudes (124) of the abutting block (12) are respectively coupled with the two first locating protrudes (113) to position the abutting block (12) so as to prevent the abutting block (12) falling out from the tube clamp (100 and missing.

Figure 8:
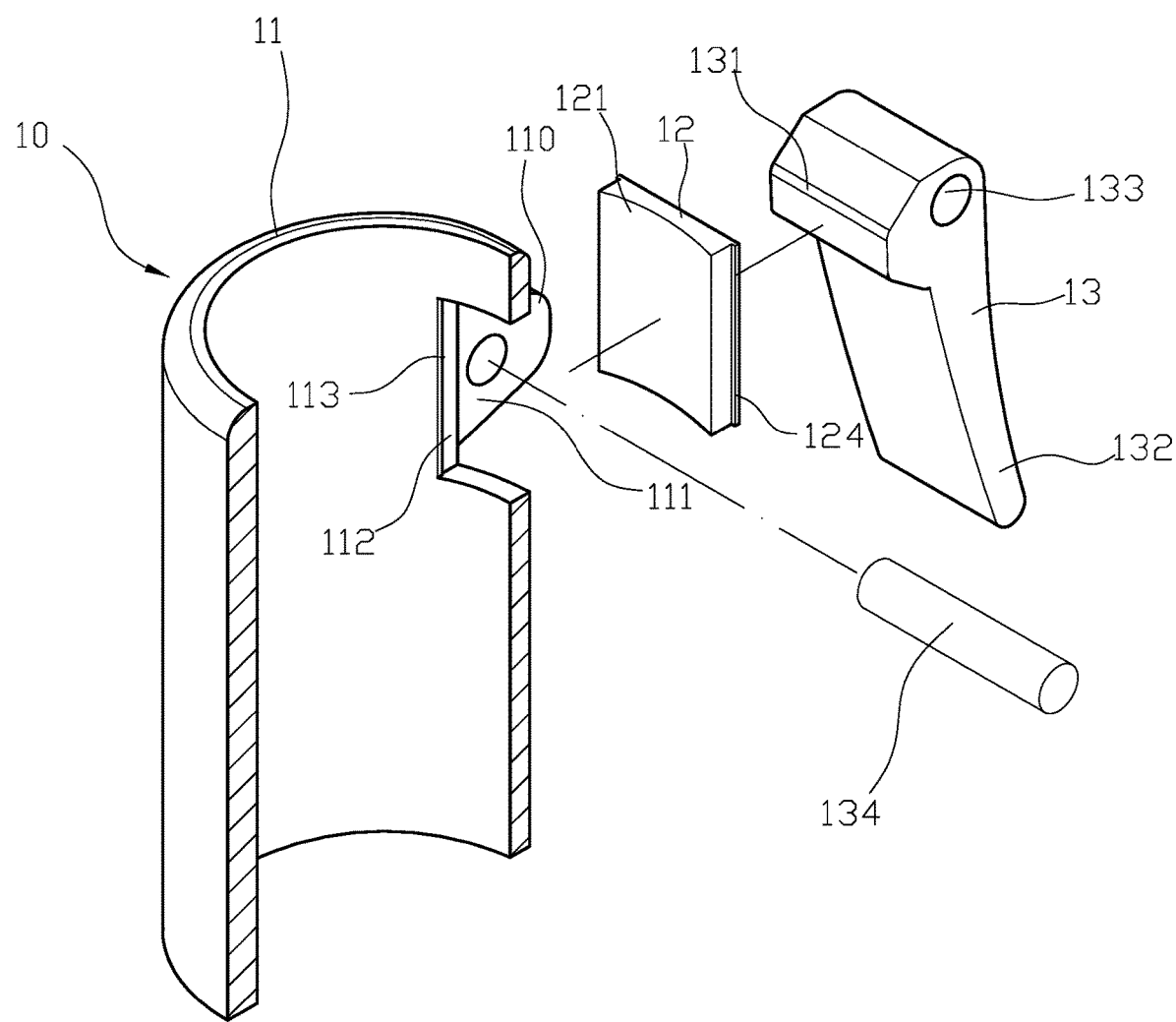
FIG. 8 is a three-dimensional view of a second embodiment of the tube clamp in the present invention.
Figure 9:
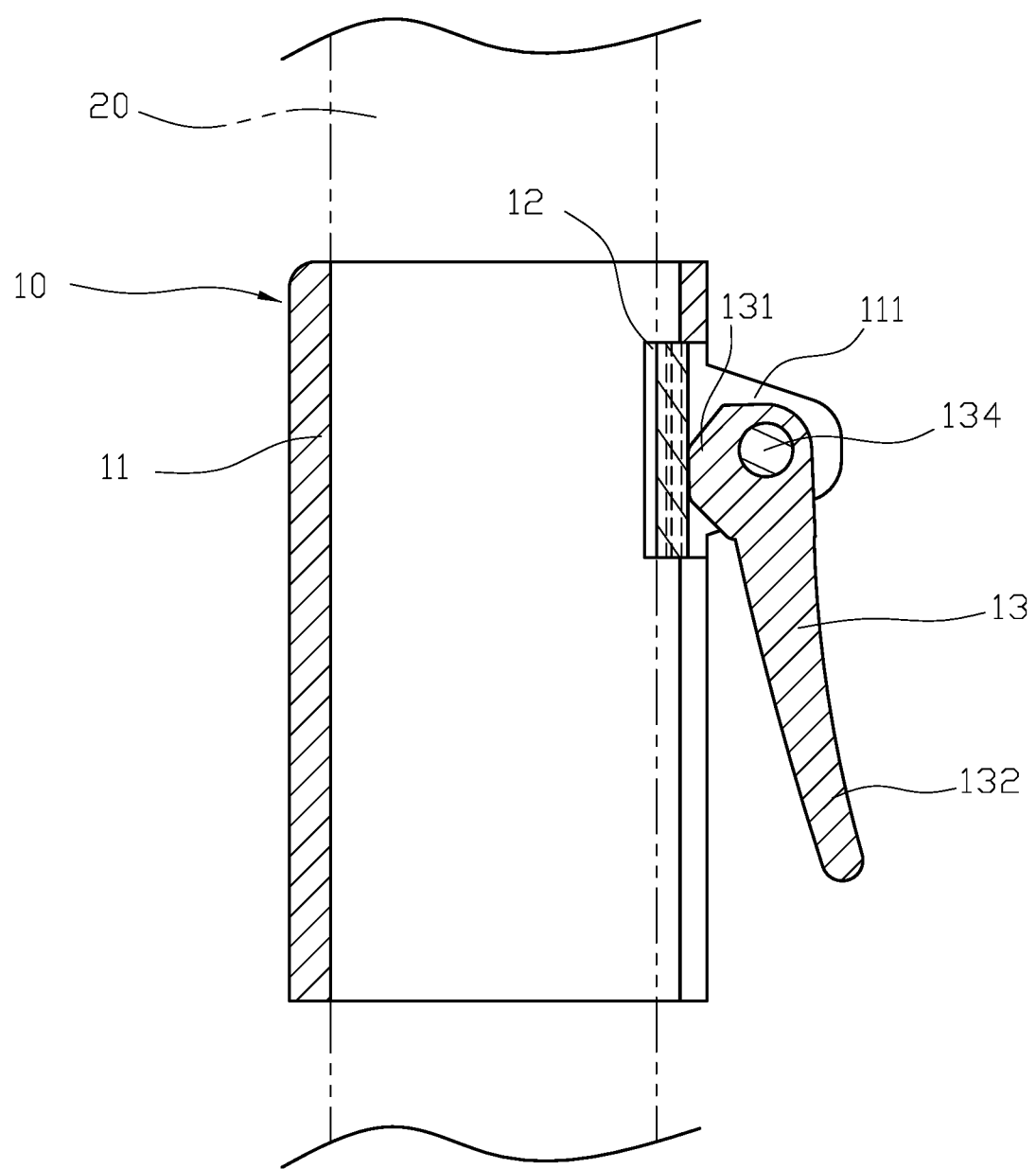
FIG. 9 is a schematic view illustrating the second embodiment of the tube clamp when the present invention is in use.

In one embodiment, referring to FIGS. 8 and 9, the two parallel ear portions (110), which are separated apart, horizontally protrude from the outer periphery of the tube body (11) at the same height to form the pivot connecting portion (111) therebetween, and the clamping member (13) is pivotally connected to the tube body (11) through the two ear portions (110) so as to have horizontal axis of rotation when pulled; through operating the clamping member (13), the abutting block (12) is pressed by the clamping member (13) to move inwardly so as to achieve the clamping effect.

Figure 10:
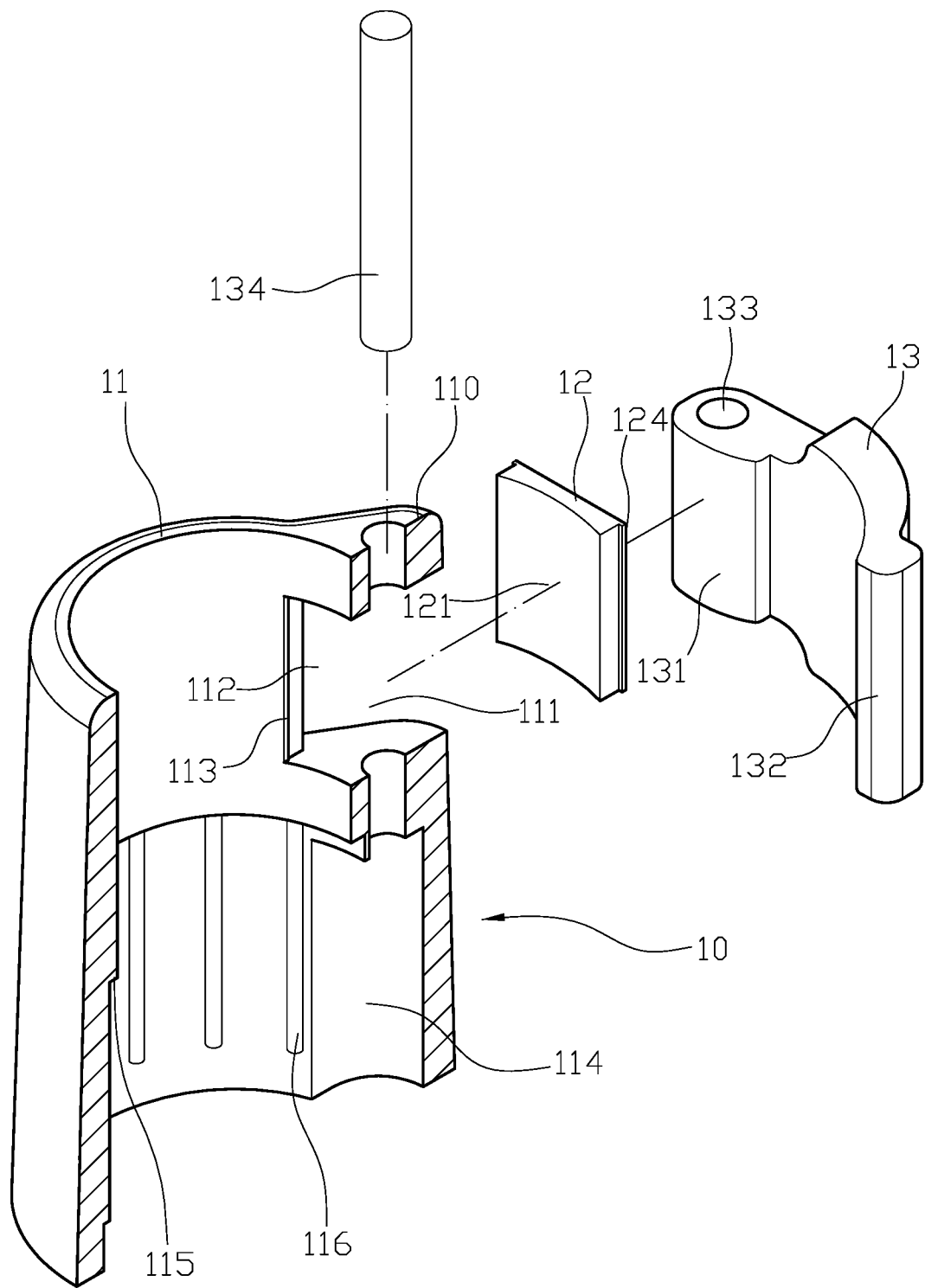
FIG. 10 is a three-dimensional view of a third embodiment of the tube clamp in the present invention.
Figure 11:
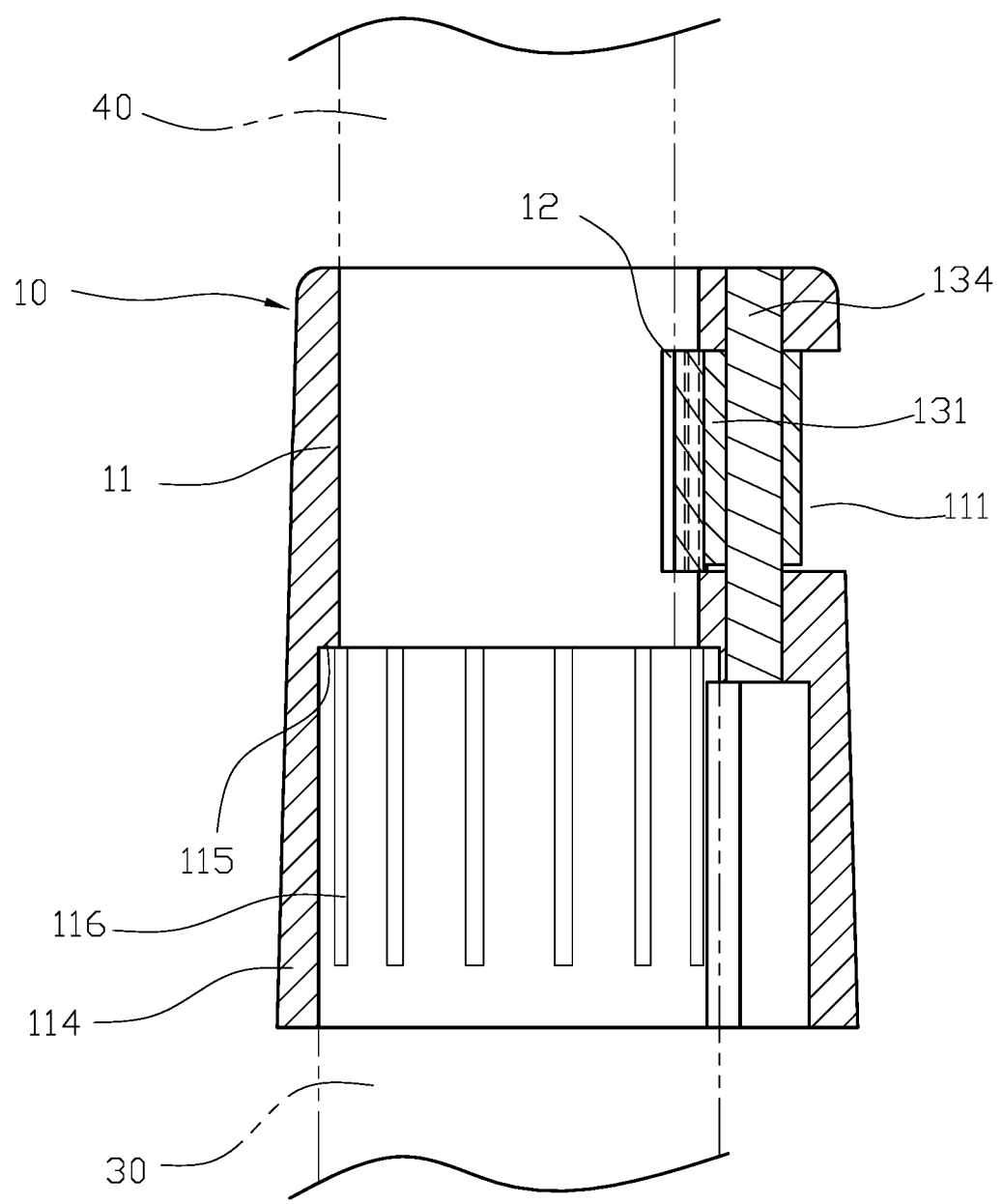
FIG. 11 is a schematic view illustrating the third embodiment of the tube clamp when the present invention is in use.
Figure 12:
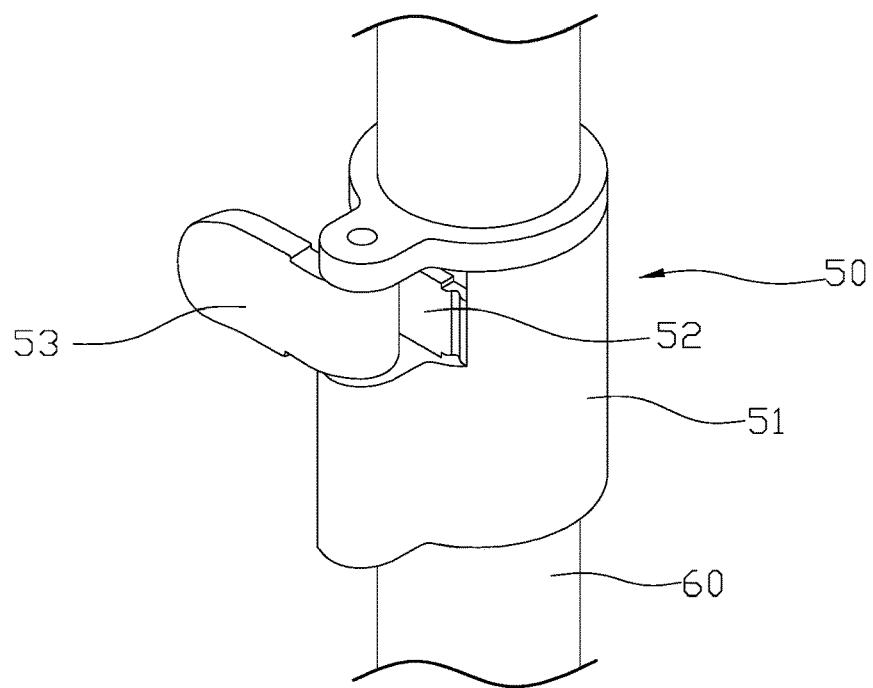
FIG. 12 is a prior art.
Figure 13:
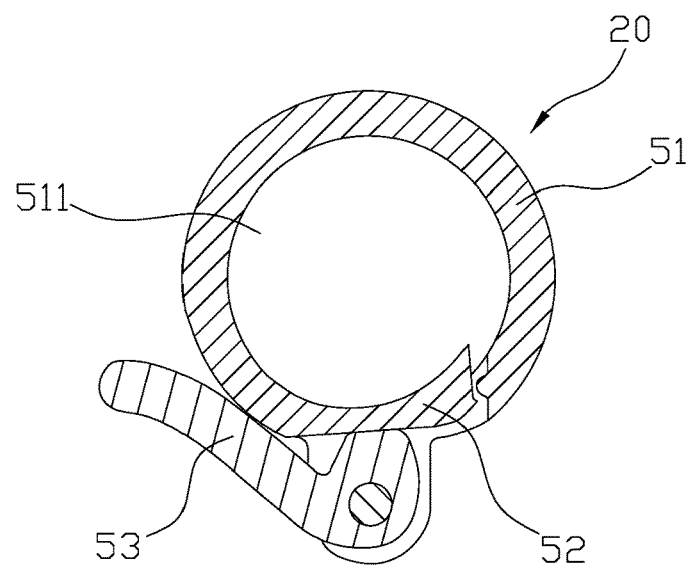
FIG. 13 is a prior art.

In another embodiment, referring to FIGS. 10 and 11, a lower portion of the tube body (11) of the tube clamp (10) is formed into an engaging portion (114) which has a larger outer diameter than the tube body (11); a step-shaped abutting edge (115) is formed at an upper end of an inner periphery of the engaging portion (114), and a plurality of vertical ribs (116) horizontally protrude from an inner wall of the engaging portion (114); when the tube clamp (10) is downwardly disposed on a seat tube (30) through the engaging portion (114), the abutting edge (115) is adapted to couple with an upper end of the seat tube (30) such that an external tube such as a telescopic inner tube (40) is configured to downwardly connect to the seat tube (30) through the tube clamp (10), and through the clamping member (13) and the abutting block (12), the tube clamp (10) is configured to secure a position of an external tube.

Comparing with conventional tube clamp, the present invention is advantageous because: (i) the abutting block (12) is slidably coupled with the through hole (112) so that the abutting block (12) can evenly shift into the tube body (11), which increases the coupled area between the abutting block (12) and the vertical tube (20) so as to improve the clamping strength; and (ii) with the cooperating between the first locating protrudes (113) and the second locating protrudes (124), the abutting block (12) is not detached from the through hole (112) when the clamping member (13) is operated, which improves the clamping effect of the tube clamp (10).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A tube clamp comprising:
  a tube body,
  an abutting block,
  a clamping member, and
  a pivot connecting portion formed at a lateral edge of the tube body;

wherein a through hole penetrates through a lateral surface of the tube body at a position corresponding to the pivot connecting portion, and each of two lateral edges of the through hole having a first locating protrude comprising a stepped surface; a lateral surface of the abutting block, which is faced to the through hole, is formed into a concave surface;

wherein the abutting block is slidably installed in the through hole, and each of two lateral sides of the abutting block includes a second locating protrude, and the two second locating protrudes respectively coupled with the two first locating protrudes so as to position the abutting block;

wherein the clamping member has a protruding portion and a pulling portion, and the protruding portion includes a connecting hole at an eccentric portion thereof and a bolt configured to penetrate through two parallel ear portions and the connecting hole to pivotally connect the clamping member with the pivot connecting portion of the tube body; through pulling the pulling portion, the protruding portion is adapted to press the abutting block into an inner space of the tube body so as to achieve the clamping effect of the tube clamp, wherein a lower portion of the tube body of the tube clamp is formed into an engaging portion which has a larger outer diameter than the tube body; a step-shaped abutting edge is formed at an upper end of an inner periphery of the engaging portion, and a plurality of vertical ribs horizontally protrude from an inner wall of the engaging portion.

2. The tube clamp of claim 1, wherein the two parallel ear portions horizontally protrude from an outer periphery of the tube body at different heights to form the pivot connecting portion therebetween, and the clamping member is pivotally connected to the tube body through the two parallel ear portions so as to have vertical axis of rotation when pulled.

3. The tube clamp of claim 2, wherein the two parallel ear portions, which are separated apart, horizontally protrude from the outer periphery of the tube body at the same height to form the pivot connecting portion therebetween, and the clamping member is pivotally connected to the tube body through the two ear portions so as to have horizontal axis of rotation when pulled.

4. The tube clamp of claim 1, wherein the tube body is a hollow cylinder.

5. The tube clamp of claim 1, wherein the concave surface of the abutting block has a plurality of convexes thereon.

6. The tube clamp of claim 1, wherein the concave surface of the abutting block has a plurality of horizontal ribs thereon.

* * * * *